(12) United States Patent
MacLachlan

(10) Patent No.: US 9,663,298 B2
(45) Date of Patent: May 30, 2017

(54) CONVEYOR BELT MODULE WITH SHAPED BOTTOM SURFACE

(71) Applicant: Laitram, L.L.C., Harahan, LA (US)

(72) Inventor: Gilbert J. MacLachlan, Harahan, LA (US)

(73) Assignee: Laitram, L.L.C., Harahan, LA (US)

(*) Notice: Subject to any disclaimer, the term of this patent is extended or adjusted under 35 U.S.C. 154(b) by 0 days.

(21) Appl. No.: 14/575,019

(22) Filed: Dec. 18, 2014

(65) Prior Publication Data

US 2016/0176642 A1 Jun. 23, 2016

(51) Int. Cl.
*B65G 17/08* (2006.01)
*B65G 17/06* (2006.01)
*B65G 17/00* (2006.01)
*B65G 15/30* (2006.01)

(52) U.S. Cl.
CPC .................................. *B65G 17/08* (2013.01)

(58) Field of Classification Search
None
See application file for complete search history.

(56) References Cited

U.S. PATENT DOCUMENTS

| 5,156,262 A | 10/1992 | Horton |
| 5,775,480 A | 7/1998 | Lapeyre et al. |
| 5,906,270 A | 5/1999 | Faulkner |
| 6,036,001 A * | 3/2000 | Stebnicki ............ B65G 17/086 198/852 |
| 6,036,011 A * | 3/2000 | DeCurtis ................ A45C 15/00 190/11 |
| 6,357,581 B1 | 3/2002 | Guldenfels |
| 7,980,385 B2 | 7/2011 | Guernsey |
| 8,905,227 B2 | 12/2014 | Pertuit, Jr. |
| 2008/0023303 A1 | 1/2008 | Layne et al. |

FOREIGN PATENT DOCUMENTS

| WO | 2006014910 A2 | 2/2006 |
| WO | 2012128621 A1 | 9/2012 |

OTHER PUBLICATIONS

International Search Report and Written Opinion of the International Searching Authority, PCT/US2015/063103, mailed Mar. 8, 2016, Korean Intellectual Property Office, Daejeon, Republic of Korea.

* cited by examiner

*Primary Examiner* — Kavel Singh
(74) *Attorney, Agent, or Firm* — Catherine M. Bishop

(57) ABSTRACT

A conveyor belt module has a conveying surface and a shaped bottom surface. The shaped bottom surface includes a concave lateral channel in the shape of a bell curve, designed to accommodate a nosebar, so that a conveyor belt formed of the modules can smoothly navigate the nosebar. The module includes hinge elements having elongated, slotted openings that are offset from the vertical center of the module.

21 Claims, 5 Drawing Sheets

CONVEYOR BELT MODULE WITH SHAPED BOTTOM SURFACE

BACKGROUND OF THE INVENTION

The invention relates generally to power-driven conveyors and more particularly to modular plastic conveyor belts.

Modular plastic conveyor belts are widely used in various industries to convey products. Modular plastic conveyor belts are constructed of a series of rows of side-by-side belt modules. Hinge eyes along opposite ends of each row interleave with hinge eyes of consecutive rows. A hinge rod inserted in the interleaved hinge eyes connects the rows together at hinge joints into an endless conveyor belt loop.

Certain modular plastic conveyor belts have difficulty going around nosebars or other reversing elements. The transition from the carryway to the returnway often causes vibrations and jolting in the modules, creating instability in the conveying surface.

SUMMARY OF THE INVENTION

A conveyor belt module comprises a conveying surface and a shaped bottom surface. The shaped bottom surface facilitates smooth transition of the module around a nosebar. The shaped bottom surface may have a laterally-extending, bell-shaped concave channel shaped to accommodate the associated nosebar. The peak of the channel is as equidistant from the hinge openings as the top of the module is from the hinge openings. The conveyor belt module may have slotted hinge openings to allow the module to navigate turns as well.

According to a first aspect, a conveyor belt module comprises a module body, a first set of hinge elements with elongated hinge openings, a second set of hinge elements and a bottom surface having a concave channel extending laterally across thereof and at least one convex curve. The bottom surface of the module is defined by the bottom surface of the module body, and the bottom surfaces of the first and second sets of hinge elements.

According to another aspect, a conveyor belt module comprises a module body, a first set of hinge elements, a second set of hinge elements and a shaped bottom surface. The shaped bottom surface includes a first convex curve converging with a central concave curve and a second convex curve converging with the c concave curve. The radius of curvature of the first convex curve is greater than the radius of curvature of the central concave curve.

According to still another aspect, a conveyor belt module comprises a module body a first set of hinge elements, a second set of hinge elements and a shaped bottom surface including a first convex curve, a central concave curve and a second convex curve. The peak of the central concave curve is below the hinge openings in the first set of hinge elements.

According to another aspect, a conveyor belt module comprises a module body, first and second sets of hinge elements and a shaped bottom surface including a first convex curve, a central concave curve and a second convex curve. The first convex curve has a center of curvature that also forms a center of curvature of a curved bearing surface in a corresponding hinge opening of an associated hinge element.

According to yet another aspect, a conveyor belt module comprises an upper portion and a lower portion below the upper portion. The upper portion includes a central body and a plurality of hinge elements having hinge openings vertically centered in the upper portion. The lower portion tapers in thickness from a first thickness near the outside ends of the module to a thickness of approximately zero in a longitudinal center of the module. The lower portion includes a convex curve on the bottom surface thereof.

According to still another aspect of the invention, a conveyor is provided. The conveyor comprises carryway, a radius conveyor belt and a nosebar at the end of the carryway for guiding the conveyor belt off the carryway and into a returnway. The radius conveyor belt is formed of a plurality of hingedly connected modules, each conveyor belt module including at least one slotted hinge opening for hingedly connecting the module to another module in the belt. The conveyor belt has a pitch that is larger than the diameter of the nosebar.

BRIEF DESCRIPTION OF THE DRAWINGS

These features and aspects of the invention, as well as its advantages, are better understood by referring to the following description, appended claims, and accompanying drawings, in which:

DETAILED DESCRIPTION OF THE INVENTION

Figure 1:
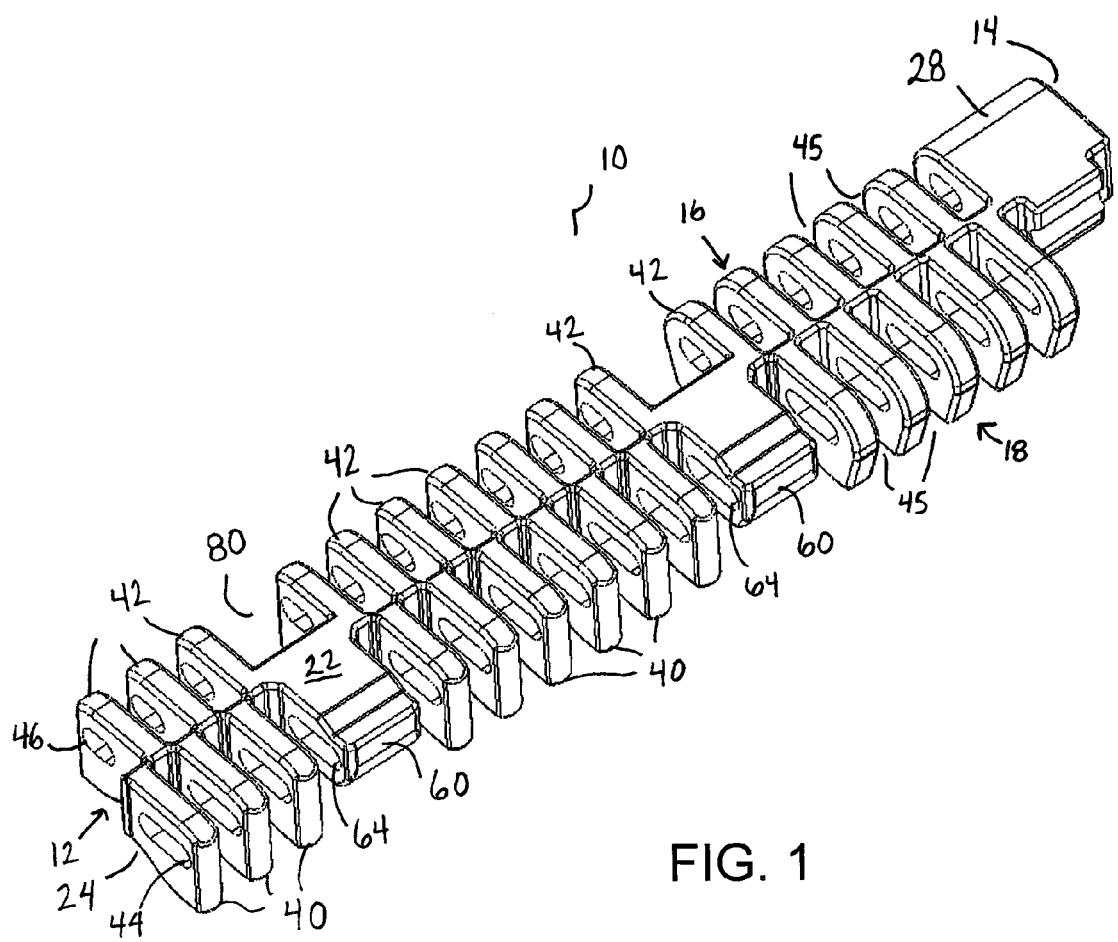
FIG. 1 is an isometric view of a conveyor belt module with a shaped bottom according to an embodiment of the invention.

A conveyor belt module employs a shaped bottom surface to facilitate transitioning around a nosebar or other element in a conveyor. The invention will be described below relative to certain illustrative embodiments, though those skilled in the art will recognize that the invention is not limited to the described embodiments.

Referring to FIGS. 1-5 an illustrative conveyor belt module 10 for a conveyor belt includes a module body, drive elements and hinge structure for linking the module to another module to form a conveyor belt. The illustrative module 10 forms a radius belt having features that allow the belt to negotiate a turn or follow a straight path. Each row of the conveyor belt may comprise a single module spanning the width of the belt or multiple modules linked together to form a row.

The illustrative module body comprises a central spine 20 extending laterally across a substantial portion of the module transverse to a direction of belt travel and vertically from a top conveying surface 22 to a bottom surface 24. The module body may have any suitable size, shape and configuration and is not limited to the illustrated spine. In one embodiment, the central spine includes an upper web or other feature to minimize gaps in the assembled conveyor belt. In another embodiment, the spine 20 or a portion of the spine is corrugated or has another non-linear shape. In another embodiment, the module body is a larger mesh, perforated or solid structure. One side of the illustrative module includes a solid end section 28 including rod-locking elements for locking a hinge rod in place.

A first set of hinge elements, shown as hinge eyes 40, extend longitudinally outward along a direction of belt travel from a first end of the central spine 20 and a second set of hinge elements, shown as hinge eyes 42, extend longitudinally outward along the direction of belt travel from a second end of the central spine 20. In the illustrative embodiment, the hinge eyes 40, 42 are considered part of the module body. The hinge eyes 40 on one end of the spine are laterally offset from the hinge eyes 42 at the other end. Gaps 45 between laterally consecutive hinge eyes are sized to receive the hinge eyes of similar modules in an adjacent row of modules in a conveyor belt. In the illustrative embodiment, the hinge openings 44 in one set of hinge eyes 40 are elongated in the direction of belt travel to form slots, though the invention is not so limited. The hinge openings 46 may also be slightly elongated, though shorter in length than the hinge openings 44. The elongated shape of the hinge openings 44 and-or 46 allow a hinge rod to slide in the opening, allowing the conveyor belt to navigate turns by collapsing at an inner edge 12 and fanning out at the outside edge 14 at the outside of a turn. The hinge openings 44, 46 may have any suitable shape, size and orientation to receive a hinge rod linking one module to another and are not limited to the illustrative embodiment.

Figure 2:
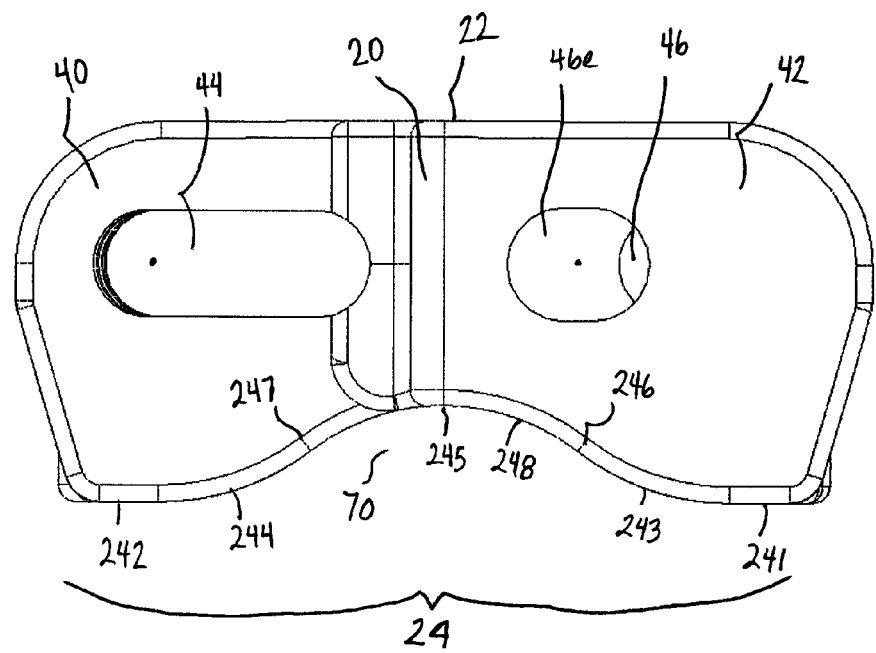
FIG. 2 is a side view of the conveyor belt module of FIG. 1.

As shown in FIG. 2, an end hinge opening 46e may be offset from the other hinge openings 46 in the second set to facilitate hinge rod retention.

The module 10 extends from a radially inner edge 12 to a radially outer edge 14 and is defined by a first longitudinal end 16, a second longitudinal end 18 opposite the first longitudinal end 16, the top conveying surface 22 and the opposing bottom surface 24.

Figure 5:
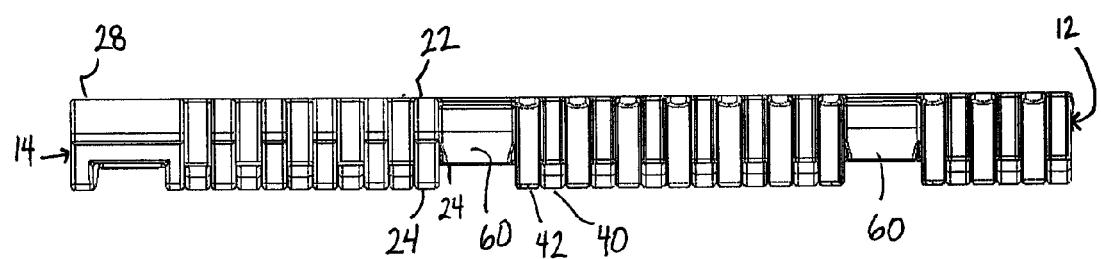
FIG. 5 is a rear view of the conveyor belt module of FIG. 1.

Drive elements 80, 60 are formed between two hinge eyes at selected locations along the length of the spine 20. The drive element 60 comprises an elongated hinge eye having an opening 64 that aligns with the adjacent hinge openings 44. The illustrative drive element 60 is at least twice as long as the hinge eyes 40, though the invention is not so limited. A drive pocket 80 is formed opposite the drive element 60 between two hinge eyes 42 near longitudinal end 16. As shown in FIG. 5, the illustrative drive element 60 is not as deep in the vertical direction as the hinge eyes 40, 42, though the invention is not so limited.

The modules are preferably made of thermoplastic polymers, such as polypropylene, polyethylene, acetal, or composite polymers in an injection-molding process. Plastic conveyor belt modules made in this way are available commercially from Intralox, L.L.C., of Harahan, La., USA. In another embodiment,the modules are formed of stainless steel or another suitable material.

A number of modules 10 are used to form a conveyor belt. The belt may comprise a series of rows of edge-to-edge belt modules. The rows are interconnected by hinge rods extending laterally through the passageways 44, 46 formed by the aligned openings in the interleaved hinge eyes between adjacent rows. The belt conveys articles atop the conveying surfaces 22 of the modules along an upper carryway portion of a conveyor. A plurality of modules may be joined side by side to form a row of the belt, or a single module may span an entire row in the conveyor belt. The use of slots as at least one set of hinge openings enables the linked modules to diverge and navigate a turn in a path.

The module 10 includes a shaped bottom portion to enable it to negotiate tight nosebar transfers. As shown in FIG. 2, the bottom surface 24 of the module includes a concave lateral channel 70. Preferably, the curve of the channel matches the curve of an associated nosebar to reduce wear on both the belt and nosebar, though the invention is not so limited. The illustrative channel 70 is symmetric, though the invention is not so limited. The illustrative channel 70 has a bell-shaped curve including flat ends 241, 242 below the hinge elements 40, 42. During normal operation, the flat ends 241, 242 ride on the carryway of the conveyor frame. The flat end surfaces 241, 242 transition to convex arcs 243, 244 below the hinge openings 44, 46. Alternatively, the end surfaces 241, 242 may be continuous curves with the convex arcs 243, 244 or have another shape. The illustrative inner surfaces 243, 244 are symmetric, mirror images of each other, though the invention is not so limited. The convex inner surfaces 243, 244 change at inflection points 246, 247, so that the bottom surface 24 arcs concavely in the middle of the channel. Concave surface 248 forms the middle portion of the channel 70. The peak 245 of the curve coincides with the spine 20 or longitudinal center of the module. The top of the channel 70 may alternatively be flat, or shaped otherwise to promote smooth movement of the belt. The shape of the curve is not limited to the illustrative bell-shape, and the bottom surface may have any suitable size and shape for navigating a nosebar.

Figure 3:
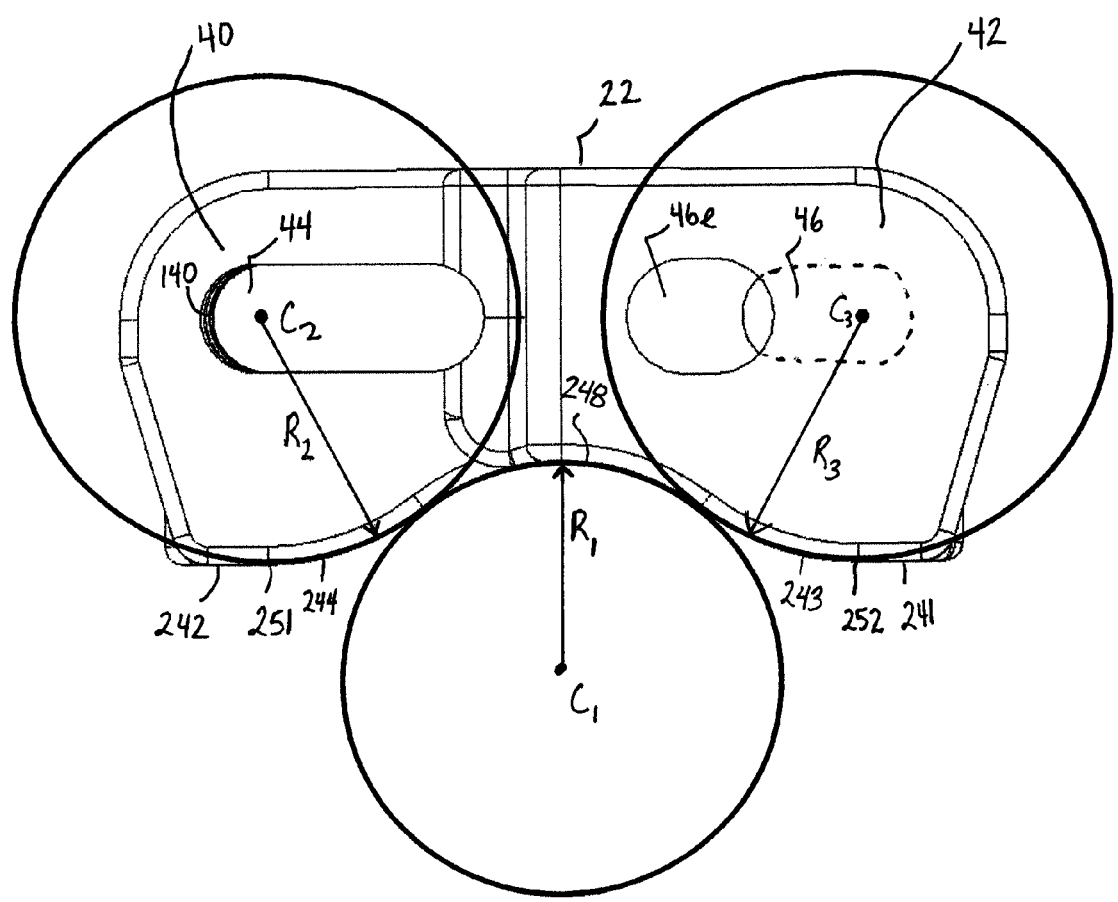
FIG. 3 is another side view of the conveyor belt module of FIG. 1, showing the radii of curvature of the surfaces on the shaped bottom of the module.

The geometry of the bottom surface allows a conveyor belt formed of the modules 10 to run smoothly over a nosebar without jostling conveyed articles, and while still allowing the use of slots as hinge openings to enable the belt to also navigate turns. As shown in FIG. 3, the concave surface 248 has a radius of curvature $R_1$ that is less than the radii of curvatures $R_2$, $R_3$ of the convex surfaces 243, 244. As also shown, the centers $C_3$, $C_2$ of curvature of the convex surfaces 243, 244 coincide with the vertical centers of the hinge openings 44, 46. The hinge openings 46 have an outer bounding wall 142 having a curve with a center of curvature that coincides with the center of curvature $C_3$ of the convex surface 243. Therefore, a hinge rod retained by the bounding wall 142 will be centered at the center of curvature $C_3$ of the convex surface 243 of the bottom surface 24. The hinge openings 44 have an outer bounding wall 140 having a curve with a center of curvature that coincides with the center of curvature $C_2$ of the convex surface 244. A hinge rod retained by the bounding wall 140 will be centered at the center of curvature $C_3$ of the convex surface 244.

The diameter of curvature of the concave curved surface 248 ($R_1 \times 2$) is selected to be about equal to the diameter of an associated nosebar 110 that the module is designed to navigate. The overall height of the module from the flat surfaces 241, 242 to the top conveying surface 22 is preferably greater than the radii of curvature of the convex surfaces 244, 243, but less than diameter of curvature ($R_2 \times 2$) of the convex surfaces 244, 243. The illustrative pitch of the belt (distance from C2 to C3) is greater than the nosebar diameter, though the invention is not so limited. For example, in one embodiment, the conveyor belt module has a pitch of about one inch, a thickness of 0.675 inches and a R1 of 0.375 inches, and the associated nosebar designed to accommodate the module has a diameter of 0.75 inches. The shaped bottom surface enables the belt to navigate a nosebar having a smaller diameter than the pitch of the belt.

The illustrative transition 251 from curve 244 to flat 242 is directly below $C_2$, while the transition 252 from curve 243 to 241 is directly below $C_3$ and the tangent line to the curves 244, 243 below the centers $C_2$, $C_3$ is parallel to the top surface 22.

Preferably, the peak 245 of the channel 70 is well below the hinge openings 44, 46 in the module.

Figure 4:
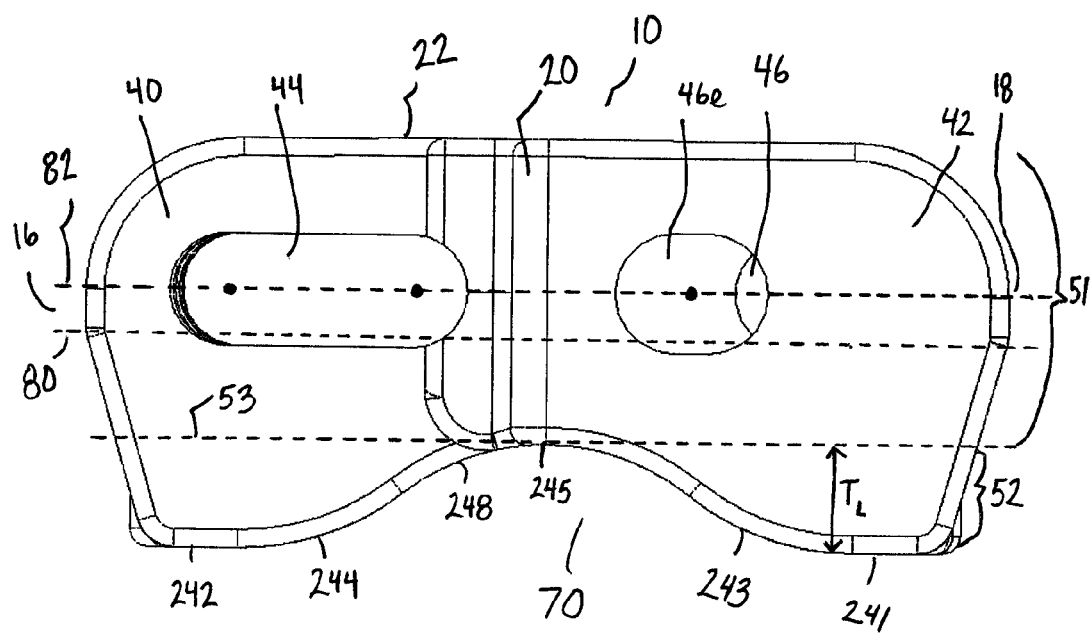
FIG. 4 is another side view of the conveyor belt module of FIG. 1, showing the upper portion and the lower portion of the module.

As shown in FIG. 4, the module 10 is essentially comprised of an upper portion 51 and a lower portion 52. The illustrative upper portion includes the spine 20 and hinge elements 40, 42. The top of the upper portion forms the conveying surface 22 and the bottom of the upper portion 12, denoted by line 53, coincides with the peak 245 of the channel 70. The lower portion 52 essentially consists of additional material added to the bottoms of the hinge elements 40, 42. The bottom material is thicker at the first longitudinal end 16 and second longitudinal end 18 of the module and the thickness $T_1$, tapers to a thickness of approximately zero in the middle of the module, at the apex 245 of the channel 70 along a curve that includes both a convex and a concave portion, as described above. The hinge eyes 44, 46 are vertically centered in the upper portion 51, and are approximately halfway between upper surface 22 and the bottom 53 of the upper portion 51. Line 82 represents the vertical center line for the upper portion 51, which aligns with the centers of the hinge eyes 44, 46. With the addition of the lower portion 12, the hinge eyes 44, 46 become offset from the vertical center of the module as a whole, represented by line 80. The hinge eyes 44, 46 and are closer to the upper surface 22 than the bottom of the module, which reaches to surfaces 241 and 242. In addition, the tangent to the bottoms of the hinge rod openings 44, 46 is preferably above the top 245 of the channel 70, though the invention is not so limited.

Figure 6:
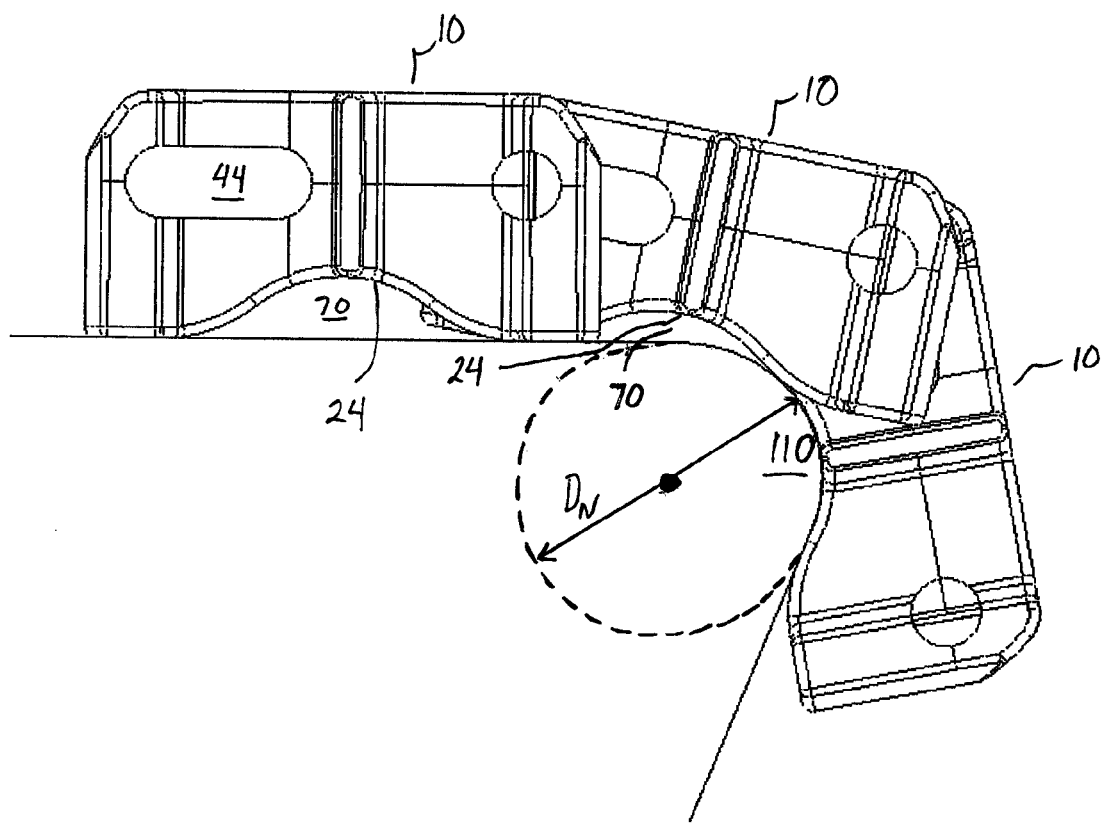
FIG. 6 shows a conveyor belt comprising a plurality of modules having shaped bottoms navigating a nosebar according to an embodiment of the invention.

As shown in FIG. 6, the bottom surface of the module is shaped to fit a nosebar 110 or other reversing element at the end of a conveyor carryway. The shaped bottom surface 24 helps stabilize the belt as the modules 10 navigate the nosebar 110, preventing conveying surface from moving up and down too much and facilitating smooth operation. Preferably, the pitch of the conveyor belt formed using the modules is greater than the diameter of the nosebar 110. The curve of the nosebar 110 matches the curve of the channel 70. As shown in FIG. 6, the shaped bottom surface enables a radius belt, which includes an elongated hinge opening 44 to allow a hinge rod to travel within the hinge passageway, to ride over the nosebar 110 without any portion of the belt protruding above the top surface C of the belt in the carryway. In addition, the shaped bottom surface enables a radius belt with a pitch P (the distance between two successive hinge pins in the belt) to navigate a nosebar 110 having a diameter $D_n$ that is smaller than the pitch P.

Although the invention has been described in detail with reference to a few exemplary versions, other versions are possible. The scope of the claims is not meant to be limited to the versions described in detail.

What is claimed is:

1. A conveyor belt module comprising:
    a module body extending laterally from a first side edge to a second side edge and longitudinally in a direction of belt travel from a first end to a second end, the module body having a top conveying surface;
    a first set of hinge elements spaced apart across first gaps and extending longitudinally outward along the first end of the module body, the first set of hinge elements including elongated hinge openings, the elongated hinge openings elongated in the direction of belt travel;
    a second set of hinge elements spaced apart across second gaps and extending longitudinally outward along the second end of the module body; and
    a bottom surface opposite the top conveying surface having a concave channel extending laterally across at least a portion of the bottom surface, the concave channel having a peak that is lower than the bottoms of the elongated hinge openings and a first convex surface below the first set of hinge elements having a radius of curvature centered within the elongated hinge openings, the bottom surface of the module defined by the bottom surface of the module body, and the bottom surfaces of the first and second sets of hinge elements.

2. The conveyor belt module of claim 1, wherein the concave channel has a bell-shaped profile.

3. The conveyor belt module of claim 1, wherein the concave channel includes a second convex surface below the second set of hinge elements having a radius of curvature centered within hinge openings in the second set of hinge elements.

4. The conveyor belt module of claim 3, wherein the concave channel includes a concave surface between the first and second convex surfaces.

5. The conveyor belt module of claim 4, wherein the concave channel has a radius of curvature that is less than the radii of curvature of the first and second convex surface.

6. The conveyor belt module of claim 4, wherein the bottom surface further comprises flat end surfaces extending longitudinally outwards from each convex surface.

7. A conveyor belt module, comprising:
    a module body extending laterally from a first side edge to a second side edge and longitudinally in a direction of belt travel from a first end to a second end, the module body having a top conveying surface;
    a first set of hinge elements spaced apart across first gaps and extending longitudinally outward along the first end of the module body and including aligned first hinge openings,
    a second set of hinge elements spaced apart across second gaps and extending longitudinally outward along the second end of the module body; and
    a shaped bottom surface opposite the top conveying surface, the shaped bottom surface including a first convex curve converging with a central concave curve having a peak that coincides with the longitudinal center of the module body and a second convex curve converging with the central concave curve, wherein the radius of curvature of the first convex curve is greater than the radius of curvature of the central concave curve and the center of curvature of the first convex curve coincides with the vertical center of the first hinge openings.

8. The conveyor belt module of claim 7, wherein the radius of curvature of the second convex curve is equal to the radius of curvature of the first convex curve.

9. The conveyor belt module of claim 7, wherein the first hinge openings are elongated.

10. The conveyor belt module of claim 7, wherein the shaped bottom surface includes a first flat surface between a first longitudinal end of the module and the first convex curve and a second flat surface between a second longitudinal end of the module and the second convex curve.

11. The conveyor belt module of claim 7, wherein the peak of the central concave curve is below the bottom of the aligned hinge openings.

12. A conveyor belt module, comprising:
a module body extending laterally from a first side edge to a second side edge and longitudinally in a direction of belt travel from a first end to a second end, the module body having a top conveying surface;
a first set of hinge elements spaced apart across first gaps and extending longitudinally outward along the first end of the module body;
a first set of aligned hinge openings in the first set of hinge elements;
a second set of hinge elements spaced apart across second gaps and extending longitudinally outward along the second end of the module body; and
a shaped bottom surface opposite the top conveying surface, the shaped bottom surface including a concave lateral channel formed by a first convex curve, a central concave curve defining a peak of the concave lateral channel and a second convex curve, wherein the peak coincides with the longitudinal center of the module body and is below the first set of hinge openings.

13. The conveyor belt module of claim 12, wherein the first set of aligned hinge openings are elongated in a longitudinal direction.

14. The conveyor belt module of claim 12, wherein the central concave curve has a radius of curvature that is less than a radius of curvature of the first convex curve.

15. A conveyor belt module, comprising:
a module body extending laterally from a first side edge to a second side edge and longitudinally in a direction of belt travel from a first end to a second end, the module body having a top conveying surface;
a first set of hinge elements spaced apart across first gaps and extending longitudinally outward along the first end of the module body;
a first set of aligned hinge openings in the first set of hinge elements, each opening bounded at an outer end by a curved bearing surface;
a second set of hinge elements spaced apart across second gaps and extending longitudinally outward along the second end of the module body; and
a shaped bottom surface opposite the top conveying surface, the shaped bottom surface including a first flat surface below the first set of aligned hinge elements, the first flat surface transitioning into a first convex curve, the first convex curve inflecting into a central concave curve, the central concave curve inflecting into a second convex curve, the second convex curve transitioning into a second flat surface below the second set of aligned hinge elements, wherein the first convex curve has a center of curvature that also forms a center of curvature of a curved bearing surface in a corresponding hinge opening.

16. The conveyor belt module of claim 15, wherein the hinge openings in the first set are elongated in a direction of belt travel.

17. The conveyor belt module of claim 15, wherein the concave curve has a radius of curvature that is smaller than the radius of curvature of the first convex curve.

18. A conveyor belt module comprising:
an upper portion, the upper portion including a central body extending laterally from a first side to a second side and longitudinally in a direction of belt travel from a first end to a second end and a plurality of hinge elements extending longitudinally outward from the first and second ends of the central body, the hinge elements having hinge openings vertically centered in the upper portion; and
a solid lower portion below the upper portion, wherein the lower portion tapers in thickness from a first thickness near first and second ends of the module at the tips of the first and second hinge elements to a thickness of approximately zero in a longitudinal center of the module, the solid lower portion including a convex curve on a bottom surface thereof.

19. The conveyor belt module of claim 18, wherein the bottom surface of the solid lower portion has a bell curve profile.

20. The conveyor belt module of claim 18, wherein at least one hinge opening is elongated in a direction of belt travel.

21. The conveyor belt module of claim 18, wherein the convex curve on the bottom surface has a center of curvature that aligns with a center of a hinge opening.

* * * * *